(12) United States Patent
Kitamura et al.

(10) Patent No.: US 8,236,201 B2
(45) Date of Patent: *Aug. 7, 2012

(54) BLUE PHOSPHOR, LIGHT-EMITTING DEVICE, AND PLASMA DISPLAY PANEL

(75) Inventors: Yayoi Kitamura, Osaka (JP); Seigo Shiraishi, Osaka (JP); Kojiro Okuyama, Nara (JP); Masahiro Sakai, Kyoto (JP)

(73) Assignee: Panasonic Corporation, Osaka (JP)

( * ) Notice: Subject to any disclaimer, the term of this patent is extended or adjusted under 35 U.S.C. 154(b) by 627 days.

This patent is subject to a terminal disclaimer.

(21) Appl. No.: 12/438,071

(22) PCT Filed: Mar. 28, 2008

(86) PCT No.: PCT/JP2008/000810
§ 371 (c)(1),
(2), (4) Date: Feb. 19, 2009

(87) PCT Pub. No.: WO2008/149485
PCT Pub. Date: Dec. 11, 2008

(65) Prior Publication Data
US 2010/0164360 A1    Jul. 1, 2010

(30) Foreign Application Priority Data
Jun. 8, 2007  (JP) ................. 2007-153287

(51) Int. Cl.
*C09K 11/08* (2006.01)
*C09K 11/66* (2006.01)
*C09K 11/02* (2006.01)
*C09K 11/77* (2006.01)

(52) U.S. Cl. ............... 252/301.4 F; 252/301.4 R
(58) Field of Classification Search ............ 252/301.4 F, 252/301.4 R
See application file for complete search history.

(56) References Cited

U.S. PATENT DOCUMENTS

| 7,221,083 | B2 | 5/2007 | Oaku et al. |
| 7,902,756 | B2* | 3/2011 | Sakai et al. ............ 313/582 |
| 2004/0239247 | A1 | 12/2004 | Kawamura et al. |
| 2007/0247051 | A1 | 10/2007 | Kuze et al. |

FOREIGN PATENT DOCUMENTS

| JP | 2003-132803 A | 5/2003 |
| JP | 2003-336048 A | 11/2003 |
| JP | 2004-176010 A | 6/2004 |
| JP | 2004-352936 A | 12/2004 |
| JP | 2006-012770 A | 1/2006 |
| JP | 2006-124644 A | 5/2006 |

OTHER PUBLICATIONS

Kyoung Jae Choi et al., "Luminescence Characteristics of $Sr_3MgSi_2O_8$:Eu Blue Phosphor for Light Emitting Diodes", Journal of the Korean Ceramic Society, vol. 4I, No. 8, pp. 573-577, 2004 with partial English translation.

* cited by examiner

*Primary Examiner* — Carol M Koslow
*Assistant Examiner* — Matthew Hoban
(74) *Attorney, Agent, or Firm* — Hamre, Schumann, Mueller & Larson, P.C.

(57) ABSTRACT

The present invention provides a phosphor having high luminance, a property of low luminance degradation during driving of a light-emitting device and manufacturing processes, and chromaticity y in PDP comparable to that of BAM:Eu. The present invention is the phosphor represented by the general formula $xSrO.yEuO.MgO.zSiO_2$ where $2.970 \leq x \leq 3.500$, $0.001 \leq y \leq 0.030$, and $1.900 \leq z \leq 2.100$ are satisfied, wherein a main peak is present in the range of diffraction angle $2\theta=16.1$ to 16.5 degree in the X-ray diffraction pattern obtained by measurement on the blue phosphor using an X-ray with a wavelength of 0.774 Å, and at least one condition of the following conditions (A1) and (A2) is satisfied: (A1) at least two peaks whose tops are located in the range of diffraction angle $2\theta=15.3$ to 16.1 degree are present; and (A2) at least two peaks whose tops are located in the range of diffraction angle $2\theta=22.2$ to 23.3 degree are present.

7 Claims, 4 Drawing Sheets

BLUE PHOSPHOR, LIGHT-EMITTING DEVICE, AND PLASMA DISPLAY PANEL

TECHNICAL FIELD

The present invention relates to a blue phosphor, and a light-emitting device such as a plasma display panel (hereinafter referred to as PDP).

BACKGROUND ART

Various aluminate phosphors have been put to practical use as phosphors for energy-saving fluorescent lamps. As a blue phosphor, for example, $(Ba,Sr)MgAl_{10}O_{17}$:Eu (BAM:Eu) is mentioned. As a green phosphor, for example, $CeMgAl_{11}O_{19}$:Tb, $BaMgAl_{10}O_{17}$:Eu,Mn, and the like are mentioned.

In recent years, BAM:Eu, which has high luminance under vacuum-ultraviolet excitation, has been used as a blue phosphor for a PDP.

However, when a light-emitting device using the blue phosphor BAM:Eu is driven for a long period, the luminance is degraded significantly. Hence, in the light-emitting device use, particularly in the PDP use, there is a strong demand for a phosphor that shows less luminance degradation even after the long-time driving.

On the other hand, methods using certain types of silicate phosphors for a light-emitting device are proposed. For example, JP 2003-132803 A and JP 2004-176010 A disclose methods using $(Sr_{1-a}, Ba_a)_{3-d}MgSi_2O_8$:$Eu_d$ (where $0 \leq a \leq 1$, $0.01 \leq d \leq 0.1$). JP 2006-12770 A discloses a method using $M_{3-e}MgSi_2O_8$:$Eu_e$ (where M is at least one element selected from the group consisting of Sr, Ca and Ba, and $0.001 \leq e \leq 0.2$). JP 2006-124644 A discloses a method using $3M^1O.mMgO.nSiO_2$ (where $M^1$ is at least one element selected from the group consisting of Sr, Ca, and Ba, and $1 \leq m \leq 1.5$, $2 \leq n \leq 2.6$, $3 < m+n$).

According to elaborate studies of the present inventors, however, it has been found that in most cases in the light-emitting devices using the above conventional phosphors, the phosphors can not inhibit the degradation of luminance during driving while maintaining the high luminance. In addition, when a phosphor in which a Sr site is not replaced with Ba is used, the phosphor has higher chromaticity y and worse color purity than those of the blue phosphor BAM:Eu used in the current PDP. On the other hand, when a phosphor in which a Sr site is replaced with Ba is used, the luminance intensity of the phosphor drops significantly. Furthermore, when the above conventional phosphor having a Sr site is used, the degradation of luminance is significant during the manufacturing processes of applying and firing the phosphor with an organic binder. These constitute problems.

DISCLOSURE OF INVENTION

The present invention has achieved a solution to the above conventional problems, and it is an object of the present invention to provide a phosphor having high luminance, a property of low luminance degradation during driving of a light-emitting device and manufacturing processes, and chromaticity y in PDP comparable to that of BAM:Eu. It is a further object of the present invention to provide a long-life light-emitting device, particularly PDP, using the above phosphor.

The first embodiment of the present invention is the blue phosphor represented by the general formula $xSrO.yEuO.MgO.zSiO_2$ where $2.970 \leq x \leq 3.500$, $0.001 \leq y \leq 0.030$, and $1.900 \leq z \leq 2.100$ are satisfied, wherein a main peak is present in the range of diffraction angle $2\theta = 16.1$ to $16.5$ degree in the X-ray diffraction pattern obtained by measurement on the blue phosphor using an X-ray with a wavelength of 0.774 Å, and at least one condition of the following conditions (A1) and (A2) is satisfied:

(A1) at least two peaks whose tops are located in the range of diffraction angle $2\theta = 15.3$ to $16.1$ degree are present; and
(A2) at least two peaks whose tops are located in the range of diffraction angle $2\theta = 22.2$ to $23.3$ degree are present.

The second embodiment of the present invention is the blue phosphor represented by the general formula $xSrO.yEuO.MgO.zSiO_2$ where $2.970 \leq x \leq 3.500$, $0.001 \leq y \leq 0.030$, and $1.900 \leq z \leq 2.100$ are satisfied, wherein a main peak is present in the range of diffraction angle $2\theta = 16.1$ to $16.5$ degree in the X-ray diffraction pattern obtained by measurement on the blue phosphor using an X-ray with a wavelength of 0.774 Å, and at least one condition of the following conditions (B1) and (B2) is satisfied:

(B1) a peak or a group of peaks consisting of overlapping peaks whose top is or tops are located in the range of diffraction angle $2\theta = 15.3$ to $16.1$ degree is present, and the one-tenth value width of the peak or the group of peaks is not less than 0.13 degree and not more than 0.9 degree; and
(B2) a peak or a group of peaks consisting of overlapping peaks whose top is or tops are located in the range of diffraction angle $2\theta = 22.2$ to $23.3$ degree is present, and the one-tenth value width of the peak or the group of peaks is not less than 0.18 degree and not more than 1.5 degree.

Another embodiment of the present invention is a light-emitting device including a phosphor layer containing the above blue phosphor, and a preferable example of the light-emitting device is a plasma display panel.

This plasma display panel includes, for example, a front panel; a back panel that is arranged to face the front panel; barrier ribs that define the clearance between the front panel and the back panel; a pair of electrodes that are disposed on the back panel or the front panel; an external circuit that is connected to the electrodes; a discharge gas that is present at least between the electrodes and contains xenon that generates a vacuum ultraviolet ray by applying a voltage between the electrodes through the external circuit; and phosphor layers that emit visible light induced by the vacuum ultraviolet ray. The phosphor layers include a blue phosphor layer, and the blue phosphor layer includes the present phosphor.

According to the present invention, a phosphor that has good luminance and chromaticity and shows less luminance degradation during driving and manufacturing processes is provided. A long-life light-emitting device such as a PDP that has good luminance and chromaticity and shows less luminance degradation during the long-time driving is provided.

BEST MODE FOR CARRYING OUT THE INVENTION

Hereinafter, embodiments of the present invention will be described in detail.

<Composition of Phosphor>

The blue phosphor of the present invention is represented by the general formula xSrO.yEuO.MgO.zSiO$_2$ (where 2.970≦x≦3.500, 0.001≦y≦0.030, 1.900≦z≦2.100). With respect to x, y and z, preferable ranges are 2.982≦x≦2.999, 0.001≦y≦0.018, and 1.980≦z≦2.020, respectively. z is preferably 2.00.

<Characteristics Relating to X-Ray Diffraction of Phosphor>

The blue phosphor of the present invention is characterized in that a main peak is present in the range of diffraction angle 2θ=16.1 to 16.5 degree in the X-ray diffraction pattern obtained by measurement on the blue phosphor using an X-ray with a wavelength of 0.774 Å, and at least two peaks whose tops are located in the certain range of diffraction angle 2θ are present (condition A). Alternatively, a main peak is present in the range of diffraction angle 2θ=16.1 to 16.5 degree, as well as a peak or a group of peaks consisting of overlapping peaks whose top is or tops are located in the certain range of diffraction angle 2θ is present, and the one-tenth value width of the peak or the group of peaks falls in the certain range (condition B).

The present inventors have found from elaborate studies based on the experimental results that the blue phosphor that has the above composition and satisfies the above condition A or condition B is a phosphor that has good luminance, good chromaticity and a high luminance retaining rate. With respect to the conventional silicate blue phosphor represented by the general formula xSrO.yEuO.MgO.zSiO$_2$, the number of peak whose top is located in the above range of diffraction angle 2θ is one, and the one-tenth value width of the peak is outside the above range. The reason why the blue phosphor satisfying the above condition A or condition B has excellent light-emitting properties is not clear but assumed to be as follows.

With respect to the conventional silicate blue phosphor, the (one) peak whose top is located in the range of diffraction angle 2θ=15.3 to 16.1 degree corresponds to lattice spacing d=2.80 Å and it is composed mainly of overlap of a peak with a plane index (h, k, l)=(−4, 0, 2) and a peak with a plane index (h, k, l)=(4, 1, 1). The (one) peak whose top is located in the range of diffraction angle 2θ=22.2 to 23.3 degree corresponds to lattice spacing d=1.95 Å and it is composed mainly of overlap of a peak with a plane index (h, k, l)=(−4, 2, 2) and a peak with a plane index (h, k, l)=(4, 0, 4). In addition, plane indices of peaks that overlap the above peaks further exist in theory. For the peak whose top is located in the range of diffraction angle 2θ=15.3 to 16.1 degree, a plane index (h, k, l)=(−4, 1, 1) and a plane index (h, k, l)=(4, 0, 2) also exist. For the peak whose top is located in the range of diffraction angle 2θ=22.2 to 23.3 degree, a plane index (h, k, l)=(−4, 0, 4) and a plane index (h, k, l)=(4, 2, 2) also exist. Furthermore, besides these there are plane indices for neighboring peaks. In the experiments of the present inventors, firing under the unique condition is employed as described later so as to obtain the phosphor that satisfies the condition A or condition B. It is considered that the lattice constant of the phosphor and positions of the peaks with the above plane indices vary by this firing, which results in an increase in the peak number or appearance of the group of peaks having the certain one-tenth value width. As a result, it is considered that the light-emitting property (luminance retaining rate) of the phosphor is improved. In the present invention, the change of the peak shapes is mainly according to the above condition A or condition B, and does not involve a change of all peaks. Therefore, it is considered that it is caused not merely by the degraded crystallinity, but by the change of the crystalline structure of the silicate blue phosphor.

In the present invention, "a main peak is present in the range of diffraction angle 2θ=16.1 to 16.5 degree" means that a peak having a highest intensity is present in the range of diffraction angle 2θ=16.1 to 16.5 degree in the X-ray diffraction pattern measured in the range of diffraction angle 2θ=5 to 45 degree using an X-ray with a wavelength of 0.774 Å.

In the condition A, it is required that a main peak is present in the range of diffraction angle 2θ=16.1 to 16.5 degree and that at least one condition of the following conditions (A1) and (A2) is satisfied;

(A1) At least two peaks whose tops are located in the range of diffraction angle 2θ=15.3 to 16.1 degree are present; and (A2) At least two peaks whose tops are located in the range of diffraction angle 2θ=22.2 to 23.3 degree are present.

In the condition A, it is preferable that both of the conditions (A1) and (A2) are satisfied.

In the present invention, in order to distinguish a peak from a change of signal intensity by noise and the like, among the changes of signal intensity, a change of signal intensity having an intensity of 1/20 or more of main peak present in the range of 16.1 to 16.5 degree is recognized as a peak. In the present invention, "two peaks are present" means the case where a sign of the differential values at each angle point constituting the spectrum reverses three times within the predetermined range of diffraction angle, while ignoring noise. Therefore, here, even when two peaks overlap so as to constitute one bimodal peak, it is recognized as "two peaks are present". The case where three peaks are present should be handled in the same way.

In the condition B, it is required that a main peak is present in the range of diffraction angle 2θ=16.1 to 16.5 degree and that at least one condition of the following conditions (B1) and (B2) is satisfied:

(B1) a peak or a group of peaks consisting of overlapping peaks whose top is or tops are located in the range of diffraction angle 2θ=15.3 to 16.1 degree is present, and the one-tenth value width of the peak or the group of peaks is not less than 0.13 degree and not more than 0.9 degree; and (B2) a peak or a group of peaks consisting of overlapping peaks whose top is or tops are located in the range of diffraction angle 2θ=22.2 to 23.3 degree is present, and the one-tenth value width of the peak or the group of peaks is not less than 0.18 degree and not more than 1.5 degree.

In the condition B, it is preferable that both of the conditions (B1) and (B2) are satisfied. In the condition (B1), the one-tenth value width of the peak or the group of peaks is preferably not less than 0.13 degree and not more than 0.60 degree, and more preferably not less than 0.13 degree and not more than 0.40 degree. In the condition (B2), the one-tenth value width of the peak or the group of peaks is preferably not less than 0.18 degree and not more than 0.80 degree, and more preferably not less than 0.18 degree and not more than 0.60 degree.

Here, the one-tenth value width is defined as the full width of a peak at a height one-tenth of a peak intensity. In addition, here, a peak having a so-called shoulder is taken as one peak. Furthermore, two or more of peaks (a group of peaks) may appear in the range of diffraction angle 2θ=15.3 to 16.1 degree and 22.2 to 23.3 degree in some case. In this case, peaks constituting a group normally appear overlapping each other. In this case, with respect to the condition B, the one-tenth value width is determined assuming that the whole of a group of peaks (two or more of overlapping peaks) is taken as one peak without dividing the group of peaks into each peak. In addition, the highest value of peak intensity among the values of intensities of peaks constituting the group is employed as the value of peak intensity of the group of peaks.

With respect to the group of peaks, "peak tops are located in the range of diffraction angle 2θ=15.3 to 16.1 degree" means the case where every top of the peaks constituting a group is located in the range of diffraction angle 2θ=15.3 to 16.1 degree. The same is applied to "peak tops are located in the range of diffraction angle 2θ=22.2 to 23.3 degree" in the condition (B2).

<Powder X-Ray Diffraction Measurement>

Next, a powder X-ray diffraction measurement on the blue phosphor of the present invention will be described.

For the powder X-ray diffraction measurement, for example, BL19B2 powder X-ray diffraction equipment (Debye-Scherrer optical system using an imaging plate; hereinafter referred to as BL19 diffraction equipment) in the large-scale synchrotron radiation facility, SPring 8 is used. Phosphor powder is packed tightly into a Lindemann glass capillary with an internal diameter of 200 μm. The incident X-ray wavelength is set to approximately 0.774 Å using a monochromator. While a sample is spun using a goniometer, a diffraction intensity is recorded on an imaging plate. The measuring time is to be determined, paying attention to keep the imaging plate unsaturated. The measuring time is, for example, 5 minutes. The imaging plate is developed and an X-ray diffraction spectrum is read out.

It should be noted that an error from the zero point when the data is read out from the developed imaging plate is approximately 0.03 in terms of diffraction angle 2θ.

It should be noted that an accurate incident X-ray wavelength is confirmed using a $CeO_2$ powder (SRM No. 674a) of NIST (National Institute of Standards and Technology) whose lattice constant is 5.4111 Å. Rietveld analysis on the data measured on the $CeO_2$ powder is carried out while varying the lattice constant (a axis length). The actual X-ray wavelength λ is calculated based on the difference between the value a' obtained for the predetermined X-ray wavelength λ' and the actual value (a=5.4111 Å) from the following formula.

$$\lambda = a\lambda'/a'$$

For the Rietveld analysis, RIETAN-2000 program (Rev. 2.3.9 or later; hereinafter referred to as RIETAN) is used (see NAKAI Izumi, IZUMI Fujio, "Funmatsu X-sen kaiseki-no-jissai—Rietveld hou nyumon" (Practice of powder X-ray analysis—introduction to Rietveld method), Discussion Group of X-Ray Analysis, the Japan Society for Analytical Chemistry, Asakura Publishing, 2002, and http://homepage.mac.com/fujioizumi/).

It should be noted that X-ray diffraction is a phenomenon that is observed when crystal lattice, incidence of X-ray, and geometric arrangement of diffraction satisfy the Bragg's condition:

$$2d \sin \theta = n\lambda.$$

Though the observation of the spectrum is possible using general X-ray diffractometers, the diffraction profile observed has some differences because the observed strength depends on the incident X-ray wavelength.

<Manufacture Method of Phosphor>

Hereinafter, the method of manufacturing the phosphor of the present invention will be described below. The method of manufacturing the phosphor of the present invention is not limited to the method described below.

As a strontium source material, a strontium compound that can be converted into strontium oxide by firing, such as strontium hydroxide, strontium carbonate, strontium nitrate, strontium halide, and strontium oxalate, each having high purity (purity of 99% or more), may be used. Strontium oxide having high purity (purity of 99% or more) also may be used.

As a magnesium source material, a magnesium compound that can be converted into magnesium oxide by firing, such as magnesium hydroxide, magnesium carbonate, magnesium nitrate, magnesium halide, magnesium oxalate, and basic magnesium carbonate, each having high purity (purity of 99% or more), may be used. Magnesium oxide having high purity (purity of 99% or more) also may be used.

As a europium source material, a europium compound that can be converted into europium oxide by firing, such as europium hydroxide, europium carbonate, europium nitrate, europium halide, and europium oxalate, each having high purity (purity of 99% or more), may be used. Europium oxide having high purity (purity of 99% or more) also may be used.

As a silicon source material, various source materials that can be converted into oxides may be used in the same way.

The method for mixing the source materials may be wet mixing in a solution or dry mixing of dry powders. A ball mill, a stirred media mill, a planetary mill, a vibration mill, a jet mill, a V-type mixer, an agitator, and the like, which are in general industrial use, may be used. Since coarse particles in the source materials adversely affect the light-emitting property, it is preferable that the particles are classified to improve particle size uniformity.

Next, a phosphor is obtained by firing the mixed powder at 1000° C. to 1300° C. for 2 to 8 hours under a weakly reducing atmosphere in which partial pressure of oxygen is adjusted. It should be noted that the firing temperature has to be adjusted appropriately depending on the classification condition. The partial pressure of oxygen may be −15 to −7 in terms of log(PO2/atm). Here, "PO2/atm" means "a value of partial pressure of oxygen expressed in atm unit", and log is a common logarithm.

As a furnace to be used for the firing, furnaces that are in general industrial use may be used. A gas furnace or an electric furnace of the batch type or continuous type such as a pusher furnace may be used.

When a hydroxide, a carbonate, a nitrate, a halide, an oxalate or the like that can be converted into oxide by firing is used as a source material, it is preferable that pre-firing is carried out before main firing. The pre-firing may be carried out in an air atmosphere, but should be carried out at a temperature lower than that of the main firing by about 150° C.

Then, the obtained phosphor powder is fired at 300 to 600° C. for 1 to 5 hours under the atmosphere in which a concentration of an organic gas is adjusted. The phosphor of the present invention, which satisfies the above condition A and/or condition B, can be obtained by this firing. As the organic gas, butane and octane can be used, and it is presumed that a gas of molecules composed of a carbon atom and a hydrogen atom, such as methane, ethane, or propane, can be used similarly. The concentration of the organic gas may be 5 to 1000 ppm.

Alternatively, the phosphor obtained by the above firing under the atmosphere in which the partial pressure of oxygen is adjusted is fired with an organic compound at 300 to 600° C. for 1 to 5 hours. The phosphor of the present invention, which satisfies the above condition A and/or condition B, can be obtained also by this firing. As the organic compound, ethyl cellulose can be used, and it is presumed that other cellulose resins, acrylic resins, or urethane resins can be used similarly. In order to mix these organic compound species evenly with the phosphor, solvents such as monovalent alcohols having a high boiling point, multivalent alcohols, and compounds obtained by etherifying and/or esterifying alcohols can be used. The amount of the organic compound to be used may be 0.05 to 1.0 g relative to 1 g of the phosphor.

The particle size distribution and flowability of the phosphor powder can be adjusted by crushing the obtained phosphor powder again using a ball mill, a jet mill, or the like, and further by washing or classifying it, if necessary.

<Uses of Phosphor>

A light-emitting device having good luminance, chromaticity and luminance retaining rate can be constructed by applying the phosphor of the present invention to a light-emitting device having a phosphor layer. Specifically, for a light-emitting device having a phosphor layer in which BAM:Eu is used, all or part of BAM:Eu is replaced with the phosphor of the present invention, while a light-emitting device may be constructed according to a known method. It is possible to construct a light-emitting device in which the phosphor of the present invention and a light-emitting diode (LED) chip are used in combination. Examples of the light-emitting device include a PDP, a fluorescent panel, and a fluorescent lamp, and among them, a PDP is suitable.

Figure 1:
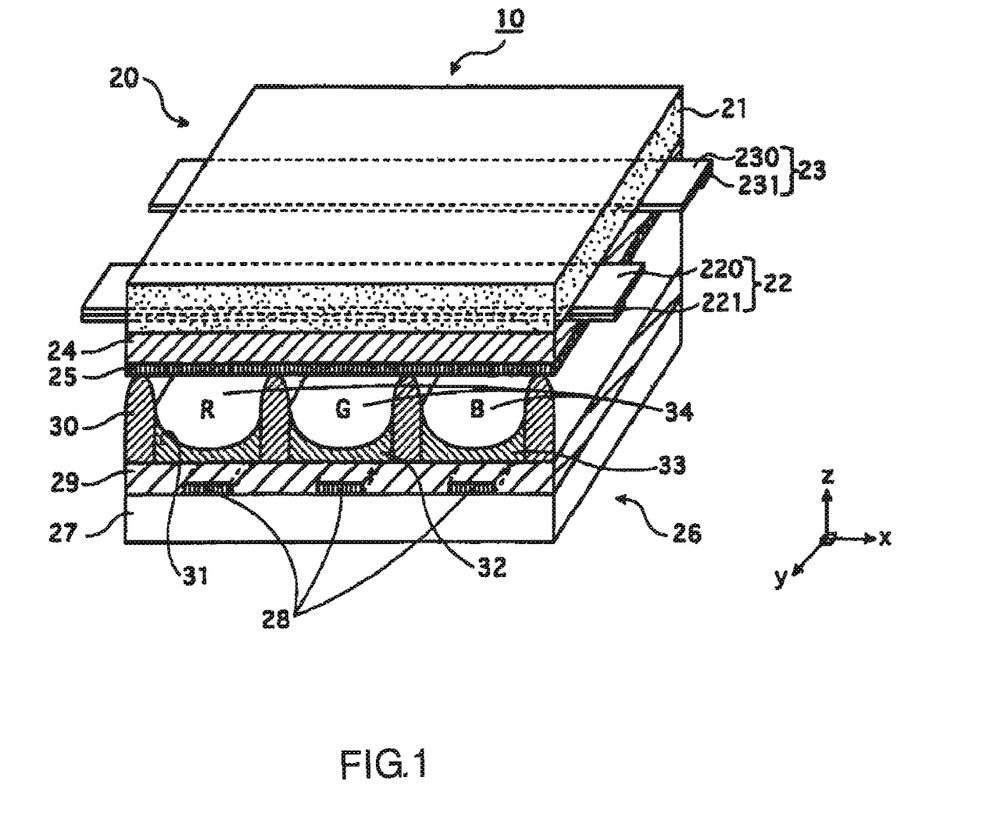
FIG. 1 is a schematic cross-sectional perspective view showing one example of a structure of the PDP of the present invention.

Hereinafter, an embodiment (the PDP of the present invention) in which the blue phosphor of the present invention is applied to a PDP will be described with an example of an AC surface-discharge type PDP. FIG. 1 is a cross-sectional perspective view showing a principal structure of an AC surface-discharge type PDP 10. It should be noted that the PDP shown here is illustrated for convenience' sake with a size that is appropriate for a specification of 1024×768 pixels, which is 42-inch class, and the present invention may be applied to other sizes and specifications as well.

As illustrated in FIG. 1, this PDP 10 includes a front panel 20 and a back panel 26, and these panels are arranged with their main surfaces facing each other.

The front panel 20 includes a front panel glass 21 as a front substrate, strip-shaped display electrodes (X-electrode 23, Y-electrode 22) provided on one main surface of the front panel glass 21, a front-side dielectric layer 24 having a thickness of about 30 μm covering the display electrodes, and a protective layer 25 having a thickness of about 1.0 μm provided on the front-side dielectric layer 24.

The above display electrode includes a strip-shaped transparent electrode 220 (230) having a thickness of 0.1 μm and a width of 150 μm, and a bus line 221 (231) having a thickness of 7 μm and a width of 95 μm and laid on the transparent electrode. A plurality of pairs of the display electrodes are disposed in the y-axis direction, where the x-axis direction is a longitudinal direction.

Each pair of display electrodes (X-electrode 23, Y-electrode 22) is connected electrically to a panel drive circuit (not shown) in the vicinity of the ends of the width direction (y-axis direction) of the front panel glass 21. It should be noted that the Y-electrodes 22 are connected collectively to the panel drive circuit and the X-electrodes 23 each are connected independently to the panel drive circuit. When the Y-electrodes 22 and the certain X-electrodes 23 are fed using the panel drive circuit, a surface discharge (sustained discharge) is generated in the gap (approximately 80 μm) between the X-electrode 23 and the Y-electrode 22. The X-electrode 23 also can operate as a scan electrode, and in this case, a write discharge (address discharge) can be generated between the X-electrode 23 and an address electrode 28 to be described later.

The above-mentioned back panel 26 includes a back panel glass 27 as a back substrate, a plurality of address electrodes 28, a back-side dielectric layer 29, barrier ribs 30, and phosphor layers 31 to 33, each of which corresponds to one color of red (R), green (G), and blue (B). The phosphor layers 31 to 33 are provided so that they contact with side walls of two adjacent barrier ribs 30 and with the back-side dielectric layer 29 between the adjacent barrier ribs 30, and repeatedly disposed in sequence in the x-axis direction.

The blue phosphor layer (B) contains the above-mentioned blue phosphor of the present invention. It should be noted that the blue phosphor of the present invention may be used singularly or several kinds of the blue phosphor of the present invention may be mixed. Moreover, the blue phosphor of the present invention may be used as a mixture with a known phosphor such as BAM:Eu. On the other hand, the red phosphor layer and the green phosphor layer contain commonly-used phosphors. Examples of a red phosphor include $(Y,Gd)BO_3$:Eu and $Y_2O_3$:Eu, and examples of a green phosphor include $Zn_2SiO_4$:Mn, $YBO_3$:Tb, and $(Y,Gd)BO_3$:Tb.

Each phosphor layer can be formed by applying a phosphor ink in which phosphor particles are dissolved to the barrier ribs 30 and the back-side dielectric layer 29 by a known applying method such as a meniscus method and a line jet method, and drying and firing them (e.g., at 500° C., for 10 minutes). The above-mentioned phosphor ink can be prepared, for example, by mixing 30% by mass of the blue phosphor having a volume average particle diameter of 2 μm, 4.5% by mass of ethyl cellulose with a mass average molecular weight of about 200,000, and 65.5% by mass of butyl carbitol acetate. In this regard, it is preferable that the viscosity thereof is adjusted eventually to about 2000 to 6000 cps (2 to 6 Pas), because the adherence of the ink to the barrier ribs 30 can be enhanced.

The address electrodes 28 are provided on the one main surface of the back panel glass 27. The back-side dielectric layer 29 is provided so as to cover the address electrodes 28. The barrier ribs 30 have a height of about 150 μm and a width of about 40 μm, and the longitudinal direction is in the y-axis direction. The barrier ribs 30 are provided on the back-side dielectric layer 29 so as to correspond to the pitch of the adjacent address electrodes 28.

Each of the address electrodes 28 has a thickness of 5 μm and a width of 60 μm. A plurality of address electrodes 28 are disposed in the x-axis direction, where the y-axis direction is a longitudinal direction. The address electrodes 28 are disposed at a certain pitch (about 150 μm). A plurality of address electrodes 28 each are connected independently to the above-mentioned panel drive circuit. Address discharge can be generated between a certain address electrode 28 and a certain X-electrode 23 by feeding each address electrode individually.

The front panel 20 and the back panel 26 are disposed so that the address electrode 28 and the display electrode are orthogonal to each other. The peripheral portions of both the panels 20 and 26 are bonded and sealed with a frit glass sealing portion (not shown) that serves as a sealing member.

An enclosed space between the front panel 20 and the back panel 26, which has been bonded and sealed with the frit glass sealing portion, is filled with a discharge gas composed of a rare gas such as He, Xe and Ne at a predetermined pressure (ordinarily about $6.7 \times 10^4$ to $1.0 \times 10^5$ Pa).

It should be noted that a space corresponding to a space between two adjacent barrier ribs 30 is a discharge space 34.

A region where a pair of display electrodes and one address electrode 28 intersect with the discharge space 34 in between corresponds to a cell used for displaying images. It should be noted that in this embodiment, the cell pitch in the x-axis direction is set to approximately 300 μm and the cell pitch in the y-axis direction is set to approximately 675 μm.

When the PDP 10 is driven, a sustained discharge is generated by applying a pulse between a pair of the display electrodes (X-electrode 23, Y-electrode 22) after an address discharge is generated by applying a pulse voltage to the certain address electrode 28 and the certain X-electrode 23 by the panel drive circuit. The phosphors contained in the phosphor layers 31 to 33 are allowed to emit visible light using the ultraviolet ray with a short wavelength (a resonance line with a central wavelength of about 147 nm and a molecular beam with a central wavelength of 172 nm) thus generated. Thereby, a prescribed image can be displayed on the front panel side.

The phosphor of the present invention can be applied to a fluorescent panel including a fluorescent layer that is excited by an ultraviolet ray and then emits light according to a known manner. This fluorescent panel has good luminance as well as an excellent resistance to luminance degradation compared to the conventional fluorescent panels. This fluorescent panel can be used, for example, as a backlight of a liquid crystal display device.

The phosphor of the present invention can be applied also to a fluorescent lamp (e.g., electrodeless fluorescent lamp, xenon fluorescent lamp, fluorescent mercury lamp) according to a known manner. This fluorescent lamp has good luminance as well as an excellent resistance to luminance degradation compared to the conventional fluorescent lamps.

Hereinafter, the embodiment of the present invention will be described in detail giving Examples. It should be noted that the present invention is not intended to be limited to the Examples.

As starting materials, $SrCO_3$, $Eu_2O_3$, MgO, and $SiO_2$ were used. These were weighed according to the compositions shown in Table 1, and wet-mixed in pure water using a ball mill. Since coarse particles in the source materials adversely affect the light-emitting property, the particles were classified to improve particle size uniformity.

After these mixtures were dried and pre-fired, they were fired at 1000° C. to 1300° C. for 4 hours under a weakly reducing atmosphere in which a partial pressure of oxygen is adjusted, and the phosphors thus were obtained. The obtained phosphor powders were fired further at 400° C. for 1 hour under the atmosphere in which an organic gas concentration was adjusted or under the atmosphere containing an organic compound, and the phosphor powders of Examples 1 to 8 thus were obtained.

On the other hand, after the raw materials were mixed according to the predetermined compositions and dried similarly, the mixtures were fired under the weakly reducing atmosphere at the temperature shown in Table 3. The phosphor powders of Comparative Examples 1 to 5 thus were obtained. In the phosphors of Comparative Examples, the phosphors of Comparative Examples 1 to 3 differ from those of Examples in the point that the phosphors of Comparative Examples 1 to 3 had not experienced the firing process under the atmosphere containing an organic gas or an organic compound.

<Powder X-Ray Diffraction Measurement>

The X-ray diffraction patterns of the phosphors of Examples and Comparative Examples were measured by the above-mentioned method, using BL19 diffraction equipment in the large-scale synchrotron radiation facility, SPring 8. It should be noted that the measuring time was set to 5 minutes.

<Measurement of Relative Luminance>

The measurement of luminance was carried out by irradiating the phosphors with a vacuum ultraviolet ray with a wavelength of 146 nm under vacuum and measuring light-emission in the visible region. The luminance is luminance Y in the XYZ color coordinate system of International Commission on Illumination and was evaluated as a value relative to the standard sample BAM:Eu ($Ba_{0.9}MgAl_{10}O_{17}:Eu_{0.1}$).

<Panel Luminance and Luminance Retaining Rate>

PDPs having the structure of FIG. 1 were manufactured according to the above-described embodiment of an AC surface-discharge type PDP, using the blue phosphors of Examples and Comparative Examples. The manufactured panels were subjected to an accelerated driving test, and the degradation of luminance after driving equivalent to 3000 hours driving from the initial luminance was measured. The luminance retaining rate thus was determined. It should be noted that the luminance is luminance Y in the XYZ color coordinate system of International Commission on Illumination and initial relative luminance was evaluated as a value relative to the standard sample BAM:Eu ($Ba_{0.9}MgAl_{10}O_{17}:Eu_{0.1}$).

<Relationship Among Composition, Crystal Structure, and Luminance and Others>

Table 1 shows the compositions of the samples of Examples and Comparative Examples (x, y, and z values of the general formula $xSrO \cdot yEuO \cdot MgO \cdot zSiO_2$), the partial pressures of oxygen during firing, the firing temperatures, and whether firing was carried out under the atmosphere containing an organic gas or not. Table 2 shows the relationship among the one-tenth value width of a peak or a peak of groups in the range of diffraction angle $2\theta=15.3$ to 16.1 degree and $2\theta=22.2$ to 23.3 degree and the number of the peaks in the range of those diffraction angles, which were obtained by the X-ray diffraction measurement of the samples of Examples and Comparative Examples, and the relative luminance, the initial luminance and the luminance retaining rate of the panel.

TABLE 1

$xSrO \cdot yEuO \cdot MgO \cdot zSiO_2$

| Sample number | x | y | z | Partial pressure of oxygen | Firing temperature/ °C. | Treatment |
|---|---|---|---|---|---|---|
| Example 1 | 2.9955 | 0.0045 | 2.0000 | High | 1100 | Yes |
| Example 2 | 2.9955 | 0.0045 | 2.0000 | Middle | 1300 | Yes |
| Example 3 | 2.9925 | 0.0075 | 2.0000 | Middle | 1250 | Yes |
| Example 4 | 2.9886 | 0.0114 | 2.0000 | Middle | 1250 | Yes |
| Example 5 | 2.9874 | 0.0126 | 2.0000 | Middle | 1200 | Yes |
| Example 6 | 2.9990 | 0.0010 | 2.0000 | Middle | 1200 | Yes |
| Example 7 | 2.9820 | 0.0180 | 2.0000 | Low | 1300 | Yes |
| Example 8 | 2.9955 | 0.0045 | 1.9900 | Middle | 1200 | Yes |
| Comparative Example 1 | 2.9895 | 0.0105 | 2.0000 | Low | 1150 | Not done |
| Comparative Example 2 | 2.9874 | 0.0126 | 2.0000 | Middle | 1250 | Not done |
| Comparative Example 3 | 2.9805 | 0.0195 | 2.0000 | Middle | 900 | Not done |
| Comparative Example 4 | 3.6000 | 0.0001 | 2.0000 | High | 1100 | Yes |
| Comparative Example 5 | 2.9500 | 0.0500 | 2.0000 | Low | 900 | Yes |

TABLE 2

| Sample number | One-tenth value width | | Number of peak | | Relative luminance/ % | Panel luminance | |
|---|---|---|---|---|---|---|---|
| | 15.3-16.1 degree/ degree | 22.2-23.3 degree/ degree | 15.3-16.1 degree | 22.2-23.3 degree | | Initial relative luminance/ % | Luminance retaining rate /% |
| Example 1 | 0.15 | 0.25 | 2 | 2 | 95 | 95 | 95 |
| Example 2 | 0.13 | 0.18 | 2 | 2 | 94 | 101 | 96 |
| Example 3 | 0.20 | 0.28 | 2 | 2 | 91 | 100 | 95 |
| Example 4 | 0.26 | 0.38 | 2 | 2 | 95 | 105 | 100 |
| Example 5 | 0.24 | 0.34 | 2 | 2 | 95 | 98 | 98 |
| Example 6 | 0.14 | 0.20 | 2 | 2 | 93 | 105 | 99 |
| Example 7 | 0.35 | 0.57 | 2 | 2 | 95 | 99 | 97 |
| Example 8 | 0.16 | 0.28 | 2 | 2 | 91 | 102 | 95 |
| Comparative Example 1 | 0.10 | 0.14 | 1 | 1 | 100 | 95 | 87 |
| Comparative Example 2 | 0.11 | 0.16 | 1 | 1 | 108 | 95 | 83 |
| Comparative Example 3 | 1.82 | 2.86 | 1 | 1 | 61 | 57 | 78 |
| Comparative Example 4 | 0.10 | 0.15 | 1 | 1 | 58 | 55 | 82 |
| Comparative Example 5 | 1.44 | 2.69 | 1 | 1 | 85 | 59 | 68 |
| Reference (BAM: Eu) | | | | | 100 | 100 | 85 |

It should be noted that in Table 1, the partial pressure of oxygen "high" is log(PO2/atm)=about −12, "middle" is log(PO2/atm)=about −13, and "low" is log(PO2/atm)=about −14. In particular, as one example of Examples, in Example 3, the partial pressure of oxygen was set to middle, butane was used as the organic gas, and the concentration thereof was set to 100 ppm. In Example 4, the partial pressure of oxygen was set to middle, and 40% by mass of the phosphor, 12% by mass of ethyl cellulose as the organic compound species, and 48% by mass of terpineol as a solvent were mixed and fired.

The values of chromaticity y of the samples of Examples 1 to 8 are comparable to that of the standard sample BAM:Eu.

Figure 2:
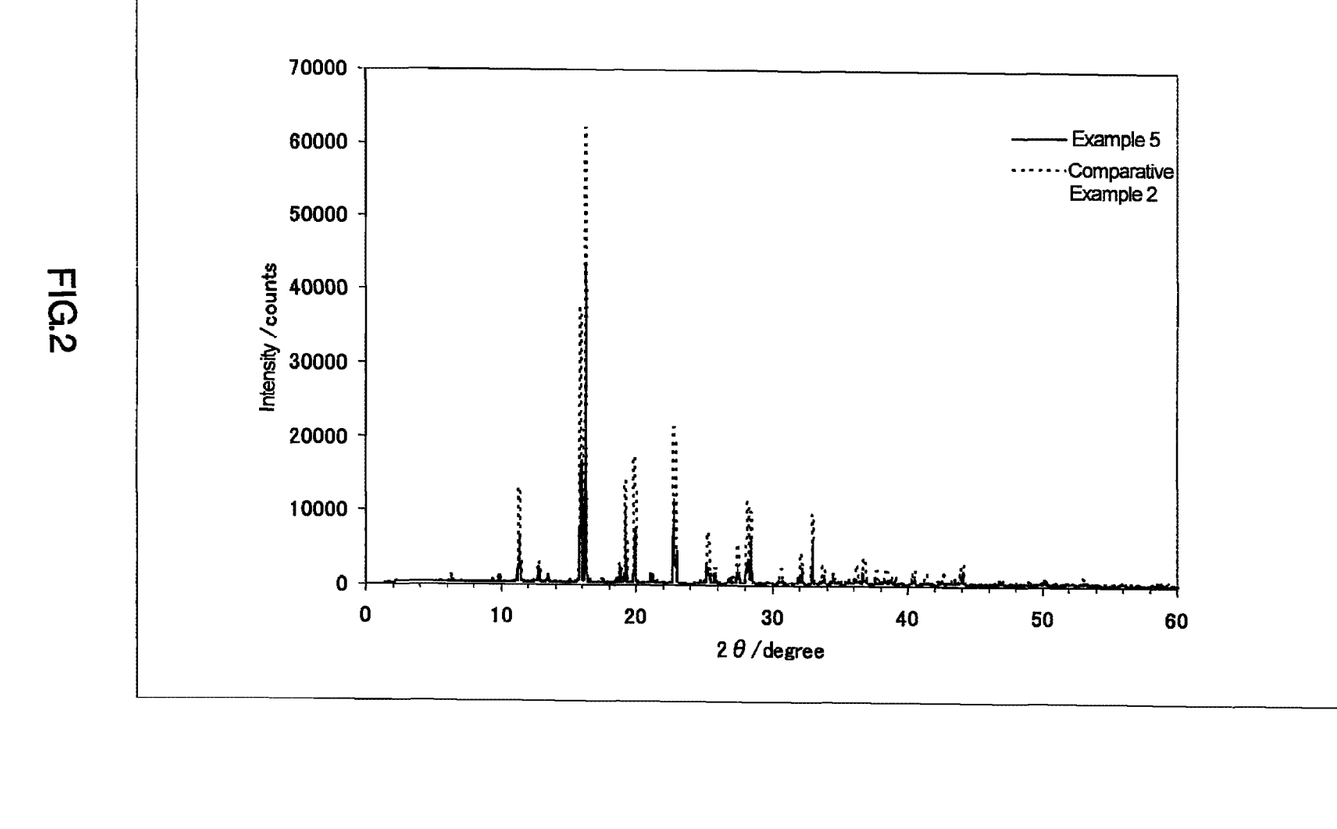
FIG. 2 shows X-ray diffraction spectra in the range of $2\theta = 0$ to 60 degree of the Example 5 of the present invention and Comparative Example 2.
Figure 3:
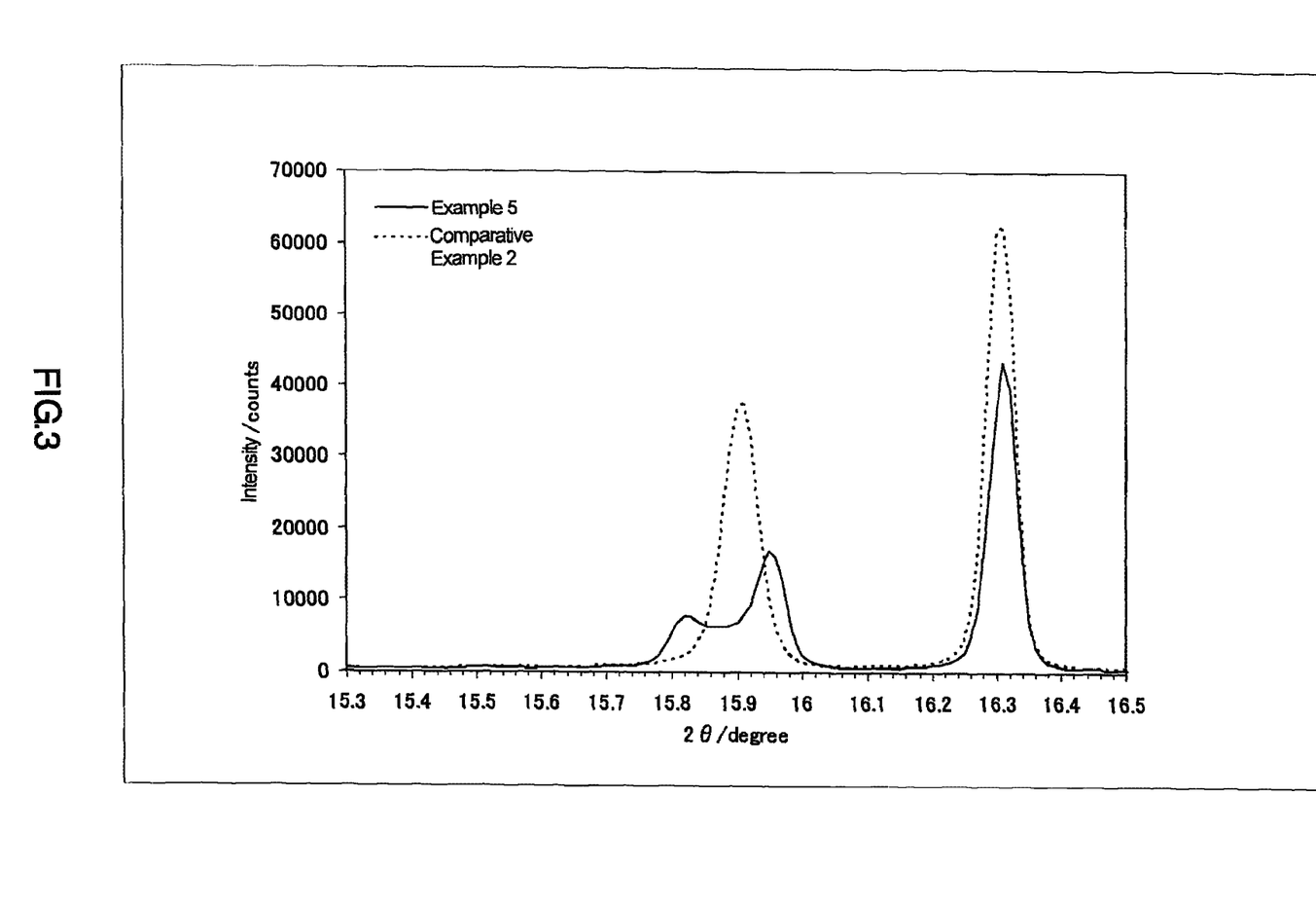
FIG. 3 shows X-ray diffraction spectra in the range of $2\theta = 15.3$ to 16.5 degree of the Example 5 of the present invention and Comparative Example 2.
Figure 4:
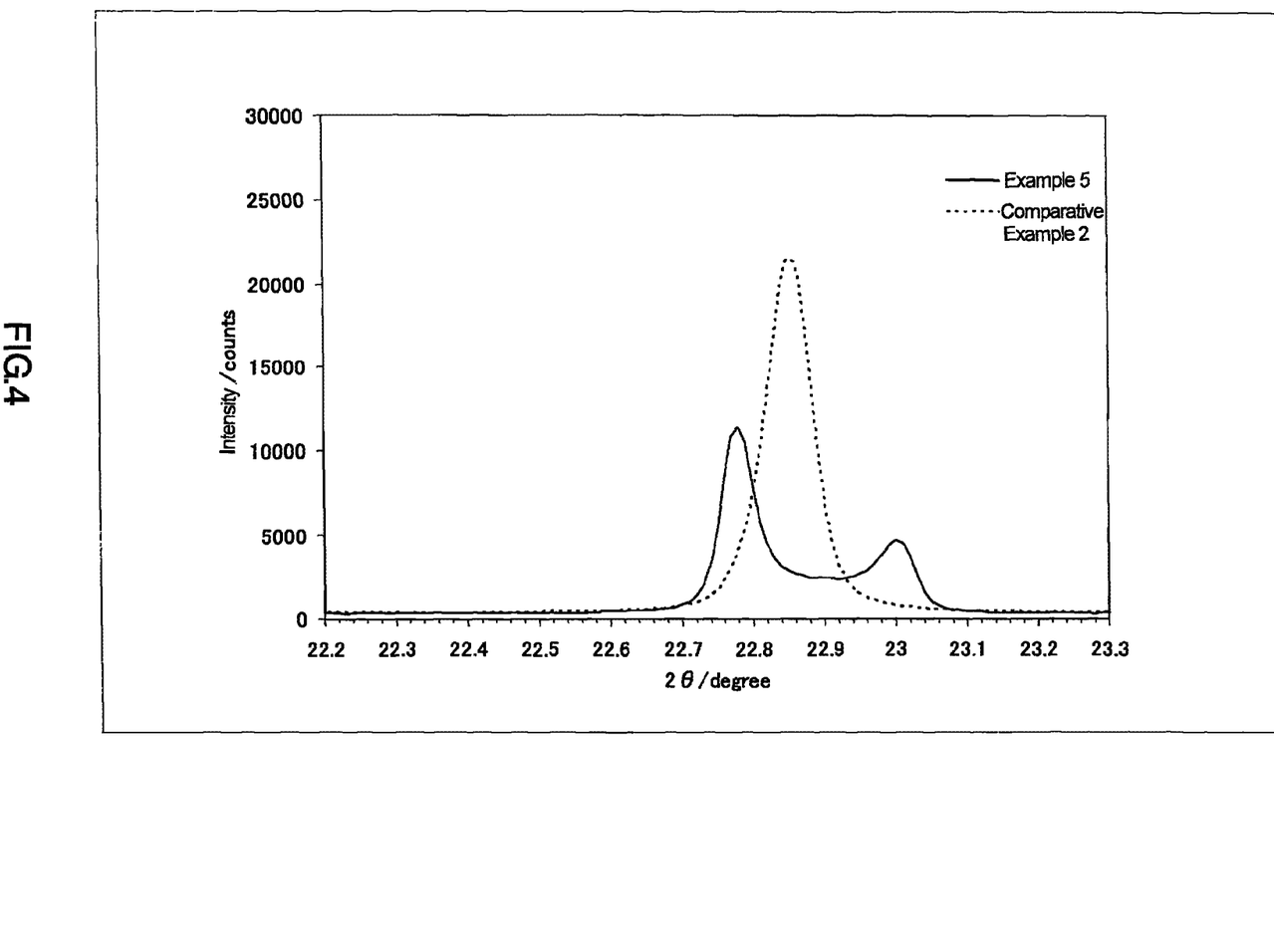
FIG. 4 shows X-ray diffraction spectra in the range of 2θ=22.2 to 23.3 degree of the Example 5 of the present invention and Comparative Example 2.

As one example of the present invention, the X-ray diffraction spectrum of Example 5 is shown in FIG. 2, and the enlarged views of each angle range are shown in FIG. 3 and FIG. 4. The X-ray diffraction spectra of Comparative Example 2 are also shown as a comparative example.

When a blue phosphor in which all values of relative luminance, initial relative luminance and a luminance retaining rate of the panel are 90% or more is defined as a phosphor having good luminance and an excellent luminance retaining rate, it can be seen from Table 2 that phosphors having good luminance and an excellent luminance retaining rate are obtained when at least two peaks whose tops are located in the range of diffraction angle 2θ=15.3 to 16.1 degree and/or at least two peaks whose tops are located in the range of diffraction angle 2θ=22.2 to 23.3 degree are present.

Furthermore, it can be seen from Table 2 that phosphors having good luminance and an excellent luminance retaining rate are obtained when a peak or a group of peaks consisting of overlapping peaks whose top is or tops are located in the range of diffraction angle 2θ=15.3 to 16.1 degree is present, and the one-tenth value width of the peak or the group of peaks is not less than 0.13 degree and not more than 0.9 degree; and/or a peak or a group of peaks consisting of overlapping peaks whose top is or tops are located in the range of diffraction angle 2θ=22.2 to 23.3 degree is present, and the one-tenth value width of the peak or the group of peaks is not less than 0.18 degree and not more than 1.5 degree.

It is considered that the change of lattice constant caused by the above firing under the atmosphere containing an organic gas leads to the increase in the number of peaks whose tops are located in the above range of diffraction angle and the increase in the one-tenth value width of the above peak or the above group of peaks in Examples relative to Comparative Examples. It is also considered that this change of lattice constant allows the phosphor to be in the state in which the phosphor preliminarily is degraded without causing the large decrease of luminance, and consequently the luminance degradation is inhibited in the manufacturing process, which results in the increase in the initial luminance and also stability in the panel.

As for the composition, substantially, $2.982 \leq x \leq 2.999$, $0.001 \leq y \leq 0.018$, and $z=2.00$ are preferable, judging from Table 1. However, it is conceivable that the cases may occur in which Sr, Eu, and Si are not incorporated actually in the crystal, or coexisting atoms which have been mixed with the phosphor after the completion of the phosphor has no adverse effects. Taking these cases into consideration, in the present invention, $2.970 \leq x \leq 3.500$, $0.001 \leq y \leq 0.030$, and $1.900 \leq z \leq 2.100$ should be allowable.

Industrial Applicability

The phosphor of the present invention can be applied to light-emitting devices, among them in particular, PDPs. Furthermore, the phosphor of the present invention can be applied to the use of fluorescent lamps such as an electrodeless fluorescent lamp, a xenon fluorescent lamp, and a fluorescent mercury lamp, fluorescent panels mainly used for a backlight of the liquid crystal display device, and the like.

The invention claimed is:

1. A blue phosphor represented by the general formula $xSrO \cdot yEuO \cdot MgO \cdot zSiO_2$ where $2.970 \leq x \leq 3.500$, $0.001 \leq y \leq 0.030$, and $1.900 \leq z \leq 2.100$ are satisfied,
    wherein a main peak is present in the range of diffraction angle 2θ=16.1 to 16.5 degree in the X-ray diffraction pattern obtained by measurement on the blue phosphor using an X-ray with a wavelength of 0.774 Å, and both of the following conditions (A1) and (A2) are satisfied:

(A1) at least two peaks whose tops are located in the range of diffraction angle 2θ=15.3 to 16.1 degree are present; and
(A2) at least two peaks whose tops are located in the range of diffraction angle 2θ=22.2 to 23.3 degree are present.

2. The blue phosphor according to claim 1, wherein $2.982 \leq x \leq 2.999$, $0.001 \leq y \leq 0.018$, and $1.980 \leq z \leq 2.020$ are satisfied.

3. A blue phosphor represented by the general formula $xSrO \cdot yEuO \cdot MgO \cdot zSiO_2$ where $2.970 \leq x \leq 3.500$, $0.001 \leq y \leq 0.030$, and $1.900 \leq z \leq 2.100$ are satisfied,
wherein a main peak is present in the range of diffraction angle 2θ=16.1 to 16.5 degree in the X-ray diffraction pattern obtained by measurement on the blue phosphor using an X-ray with a wavelength of 0.774 Å, and both of the following conditions (B1) and (B2) are satisfied:
(B1) a peak or a group of peaks consisting of overlapping peaks whose top is or tops are located in the range of diffraction angle 2θ=15.3 to 16.1 degree is present, and the one-tenth value width of the peak or the group of peaks is not less than 0.13 degree and not more than 0.9 degree; and
(B2) a peak or a group of peaks consisting of overlapping peaks whose top is or tops are located in the range of diffraction angle 2θ=22.2 to 23.3 degree is present, and the one-tenth value width of the peak or the group of peaks is not less than 0.18 degree and not more than 1.5 degree.

4. The blue phosphor according to claim 3, wherein $2.982 \leq x \leq 2.999$, $0.001 \leq y \leq 0.018$, and $1.980 \leq z \leq 2.020$ are satisfied.

5. A light-emitting device comprising a phosphor layer containing the phosphor according to claim 1.

6. The light-emitting device according to claim 5, which is a plasma display panel.

7. The light-emitting device according to claim 6, wherein the plasma display panel comprises:
a front panel;
a back panel that is arranged to face the front panel;
barrier ribs that define the clearance between the front panel and the back panel;
a pair of electrodes that are disposed on the back panel or the front panel;
an external circuit that is connected to the electrodes;
a discharge gas that is present at least between the electrodes and contains xenon that generates a vacuum ultraviolet ray by applying a voltage between the electrodes through the external circuit; and
phosphor layers that emit visible light induced by the vacuum ultraviolet ray,
the phosphor layers include a blue phosphor layer, and the blue phosphor layer includes the blue phosphor.

* * * * *

UNITED STATES PATENT AND TRADEMARK OFFICE
CERTIFICATE OF CORRECTION

PATENT NO. : 8,236,201 B2
APPLICATION NO. : 12/438071
DATED : August 7, 2012
INVENTOR(S) : Kitamura et al.

It is certified that error appears in the above-identified patent and that said Letters Patent is hereby corrected as shown below:

Title Page, Item (57) Abstract, line 6, "$xSrO.yEuO.MgO.zSiO_2$" should read
-- $xSrO \cdot yEuO \cdot MgO \cdot zSiO_2$ --.

In the Claims:

Column 12, line 61 (claim 1): "$xSrO.yEuO.MgO.zSiO_2$" should read
-- $xSrO \cdot yEuO \cdot MgO \cdot zSiO_2$ --.
Column 13, line 11 (claim 3): "$xSrO.yEuO.MgO.zSiO_2$" should read
-- $xSrO \cdot yEuO \cdot MgO \cdot zSiO_2$ --.

Signed and Sealed this
Fourteenth Day of May, 2013

Teresa Stanek Rea
*Acting Director of the United States Patent and Trademark Office*